United States Patent [19]
Andersen

[11] 3,720,931
[45] March 13, 1973

[54] AIRFLOW CONTROL SYSTEM

[75] Inventor: William F. Andersen, San Jose, Calif.

[73] Assignee: Memorex Corporation, Santa Clara, Calif.

[22] Filed: Jan. 13, 1972

[21] Appl. No.: 217,607

[52] U.S. Cl.........340/174.1 E, 179/100.2 P, 346/137
[51] Int. Cl...........................G11b 5/60, G11b 23/04
[58] Field of Search..........340/174.1 E; 179/100.2 P; 346/74 MD, 137

[56] References Cited

UNITED STATES PATENTS

| | | | |
|---|---|---|---|
| 3,191,179 | 6/1965 | Pelech et al | 340/174.1 E |
| 3,226,701 | 12/1965 | Masson | 340/174.1 E |
| 3,303,485 | 2/1967 | Lee | 340/174.1 E |
| 3,624,624 | 11/1971 | Johnson | 340/174.1 E |

*Primary Examiner*—Vincent P. Canney
*Attorney*—Karl A. Limbach et al.

[57] ABSTRACT

An air circulation control system for a magnetic recording disc drive employing a baffle pivotally mounted near the shroud which encircles the disc pack. A torsion spring holds the baffle in a retracted position against the shroud adjacent to the head access opening in the shroud for insertion and removal of disc packs. Rotation of the disc packs causes air flow across the baffle until the air flow pulls the baffle into the spaces between the discs of the disc pack. Thereafter the baffle causes an air pressure differential around the periphery of the disc pack which is used to pump cooling air through the disc drive.

6 Claims, 4 Drawing Figures

AIRFLOW CONTROL SYSTEM

SUMMARY OF THE INVENTION

Magnetic recording disc drives include a spindle for supporting and rotating a removable disc pack. Magnetic recording heads are positioned over each disc surface for reading and writing information on the disc. The recording heads are "flying heads" which are aerodynamically supported on a layer of air over the disc for non-contact recording. Ventilation is provided through the disc pack support zone for preventing excessive heating of the disc pack area.

A shroud is typically provided peripherally surrounding the disc pack with a head access opening in the shroud through which the heads are extended after a disc pack is in place. A number of disc drives of this type have been known heretofore designed for use with the IBM type 2316 disc pack in which air ventilation was provided by air flowing into the disc pack zone through air holes in the central hub of the disc pack with the air flowing outwardly across the discs for discharge at the outer edge of the disc pack.

A new generation of disc drive equipment is developing for use of the IBM type 3336 disc pack which contains no central holes for the provision of ventilation air at the center of the disc pack. The IBM type 3330 disc drive which employs the 3336 disc pack provides a large blower for forcing air into the periphery of the disc pack through one hole in the shroud while a second hole is provided in the shroud at a different radial position for discharge of the air.

In accordance with this invention, the expense and complexity of the air ventilation blower with its accompanying parts in the IBM 3330 type disc drive is eliminated by providing an aerodynamically actuated torsion spring return air baffle at the periphery of the disc pack. The baffle is mounted on the disc pack's shroud adjacent to the head access opening in the shroud by means of a hinge with the torsion spring resiliently urging the baffle toward a retracted position. An air entrance opening is provided in the shroud on the opposite side of the hinge from the head access opening with the air access opening on the "downstream" side of the head access opening in the direction of disc pack rotation.

The torsion spring holds the baffle in a retracted position so that the baffle does not interfere with insertion and removal of disc packs in the drive. When the disc pack is started, initial rotation of the discs cause peripheral air flow around the disc pack. This air flow builds up until it pulls the baffle toward the disc pack overcoming the resistance of the torsion spring. The baffle is preferably actuated by aerodynamic lift which is produced by the high velocity air stream, but alternative ways of operating the baffle can be employed. As the disc pack continues to rotate, the air flow which is driven by the disc pack causes a high pressure area on the up-stream side of the baffle and a low pressure area on the down-stream side of the baffle so that air flows into the disc pack zone through the air entrance opening in the shroud and flows out through the head accessing opening.

The baffle is preferably provided with fingers which extend into the space between the discs to increase air flow, but satisfactory results have also been obtained with an unslotted baffle which moves into a position adjacent to the periphery of the disc pack.

This structure has been built and demonstrated to be satisfactory as the sole means of ventilating the disc pack zone of a disc drive employing IBM type 3336 disc packs. Elimination of the fan not only saves the cost of the fan, but also eliminates the heat which would be added to the system by the fan. Where desirable, a separate actuating mechanism may be employed for moving the baffle into place and retracting it, such as, for instance, a cam on the door which opens and closes the disc drive for insertion of the disc pack, but I prefer to employ the torsion spring retraction and aerodynamic extension of the baffle.

Additionally, there may be situations where it is desirable to mount the baffle at a location on the disc pack remote from the head access opening in the shroud, but I prefer to employ the head access opening for air discharge for simplicity in design and to facilitate additional air flow in the area of the head accessing mechanism where further cooling is desired.

I prefer to have the air entrance opening within the first 90° of the periphery of the disc pack down stream from the head entrance opening with the baffle between the two openings as this arrangement provides optimum control of the flow of air through the disc pack.

These and other features of the invention will become apparent from the following description of a particular embodiment of the invention read in conjunction with the attached drawings in which.

Figure 1:
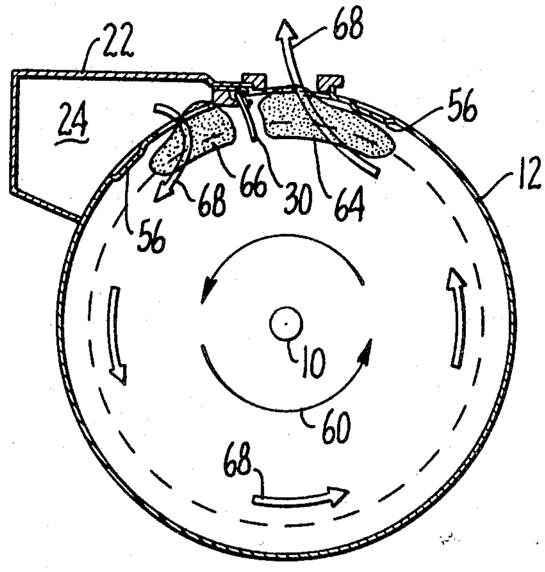
FIG. 1 is a plan view of the shroud of a disc drive employing this invention.

Referring now in detail to the drawings, and particularly to FIG. 1, the apparatus illustrated therein includes a spindle 10 for supporting and rotating conventional disc packs of the 3336 type surrounded by a shroud 12. A head access opening 14 is provided in the shroud to permit access of magnetic recording heads 16 (FIG. 3) into the disc pack 18. An air entrance opening 20 is provided in the shroud adjacent to the head access opening 14 and a plurality of panels 22 are mounted in the disc drive behind the shroud to form a plenum chamber 24 through which air flows to the air entrance opening 20. The plenum chamber 24 is provided with communication not shown to the exterior of the disc drive through which air may flow into the plenum chamber, and a conventional filtering means is provided for filtering air flowing into the plenum chamber 24 from the exterior of the disc drive. A support structure 26 behind the panels 22 supports the panels 22. The support structure 26 conveniently forms a cam tower supporting cams 28 which control the loading and unloading of the recording heads 16.

Baffle 30 is pivotally mounted on the panels 22 between the head access opening 14 and the air entrance opening 20 by means of a hinge 32, and a stop 34 is provided for limiting the pivotal motion of the baffle. The hinge 32 has one leg 36 which is clamped between the stop 34 and the panels 22 by means of screws 38 and the hinge has a second leg 40 which is spot welded to the baffle 30. A torsion spring 42 is anchored at its lower end 44 in the stop 34 and at its upper end in a hole 46 in the baffle which resiliently urges the baffle toward its retracted position shown in full line in FIG. 3 while permitting the baffle to swing to the dotted line position of FIG. 3.

Figure 3:
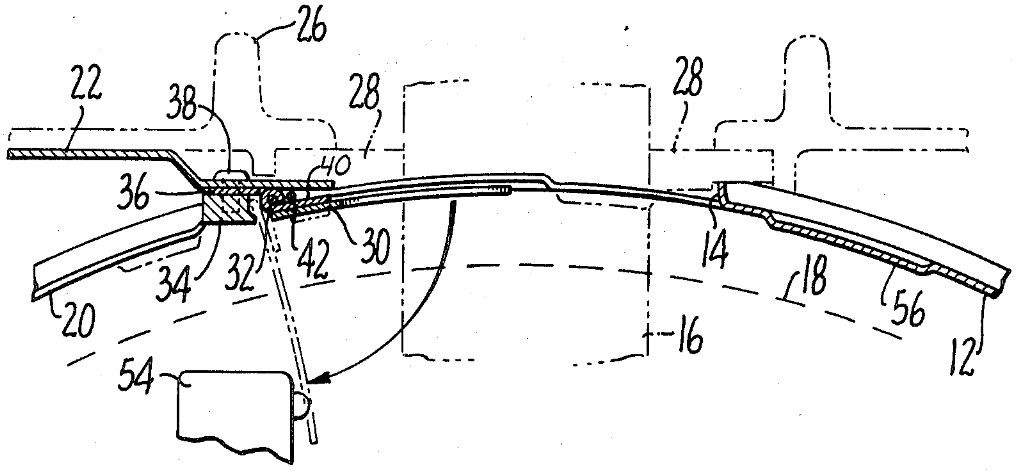
FIG. 3 is a horizontal view of the apparatus of FIG. 1 on a larger scale.
Figure 4:
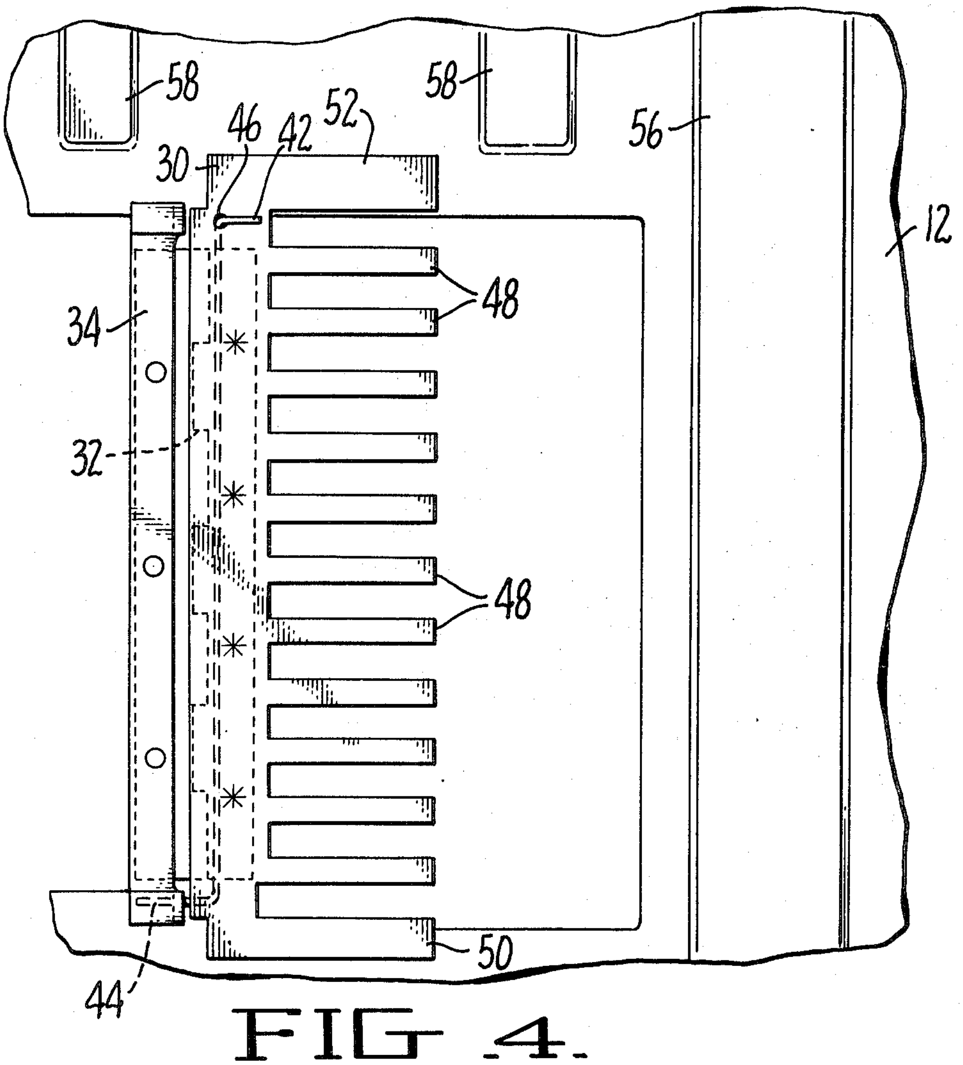
FIG. 4 is a vertical elevational view of the apparatus of FIG. 1. For simplicity in illustration, the recording heads which would be visible in the background of the drawing are omitted.

A plurality of fingers 48 are provided on the baffle 30 positioned to move into the space between adjacent discs of the disc pack 18, as best seen in FIG. 3. Where the invention is employed with the 3336 type disc pack, the baffle is preferably constructed with individual fingers 48 having a height of 0.150 inches with slots 0.225 inches wide between the blades so that there is approximately a 0.075 clearance between the baffle and discs.

It will be noted that an enlarged finger 50 is provided on the bottom of the baffle 30 and a second enlarged finger 52 is provided on the top of the baffle. The bottom finger 50 is provided to contact a limit switch 54 mounted under the disc pack to close a signaling circuit which may be employed in the operation of the disc pack to indicate that the disc pack is rotating at sufficiently high speed to sustain flight of the flying heads. The upper finger 52 is provided to generate turbulence in the air flow on top of the disc pack, to generate heat in this area and control the thermal gradient in the disc pack area.

A pair of ribs 56 are provided on the shroud on opposite sides of the baffle and a pair of ribs 58 are provided on the shroud above the baffle to protect the baffle from damage by the disc pack as the disc pack is introduced to the disc pack receiving zone in the shroud.

Figure 2:
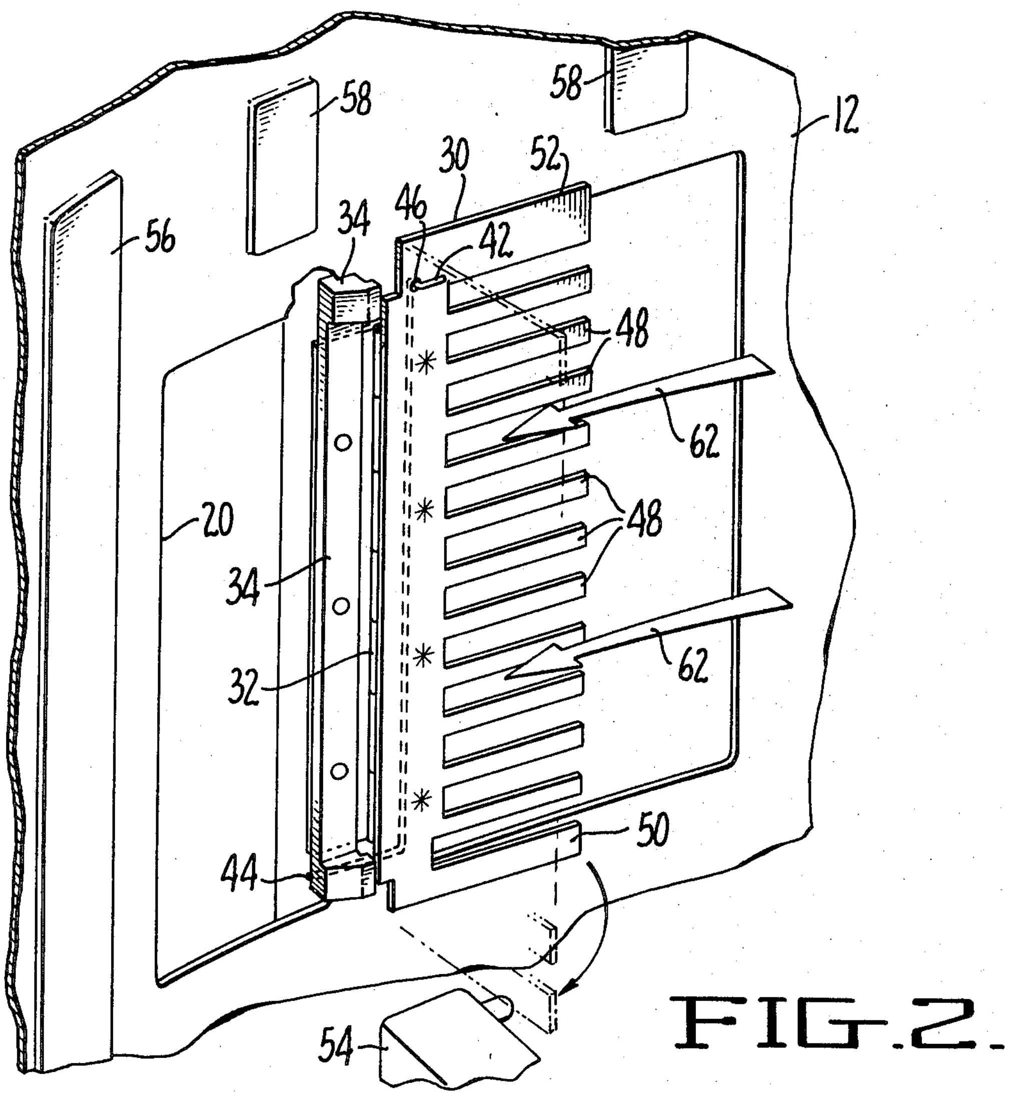
FIG. 2 is a perspective view of the air entrance and exit openings in the apparatus of FIG. 1 with the air control baffle mounted thereon. The air control baffle is shown in full line in its retractable position and in phantom outline in its extended operating position.

The air control baffle of this invention operates in the following way. When the disc pack 18 is first placed in the disc drive, the baffle 30 is in its retracted position illustrated in full line in FIG. 3. When rotation of the disc pack starts in the direction of arrow 60, the disc pack drives air flow in a circumferential direction across the baffle 30 as indicated by arrows 62 in FIG. 2 and this air flow causes lift on the baffle due to stalled air behind the baffle. When the rotation of the disc pack reaches a sufficient speed that the lift on the baffle is great enough to overcome the preload of the torsion of spring 42, the baffle is pulled away from its retracted position to a position closer to the disc pack with the fingers 48 extending into the space between the discs of the pack.

As the disc pack continues to rotate, the circumferential movement of air around the disc pack produces a high pressure area 64 on the up-stream side of the baffle and a low pressure area 66 on the downstream side of the baffle. Air flows from the high pressure area 64 out through the head access opening for cooling of the head accessing mechanism and air flows into the low pressure area 66 through the air entrance opening 20 along the path indicated by arrows 68 in FIG. 1.

It will be apparent that when the disc drive is turned off and rotation of the disc pack slows down, the baffle 30 is automatically retracted.

The drawings in the above description relate to the best mode which I now contemplate for practicing my invention, but it will be apparent to those skilled in the art that a wide variety of changes may be made in the particular structure employed.

I claim:

1. In a disc drive having a disc pack receiving zone, means for supporting and rotating a pack of parallel discs in the zone in a predetermined direction around an axis, a shroud peripherally encircling the zone and a recording head entry aperture in the shroud for permitting introduction of recording heads into the zone between adjacent discs in the zone the improved means for circulating air through the zone which comprises: an air entry opening in the shroud peripherally spaced from the head entry aperture less than 90° in the predetermined direction of rotation of the discs, a baffle spaced away from the zone for permitting the mounting and removal of disc packs in the zone, and means for moving the baffle to a position adjacent to a disc pack in the zone in an area between the head entry aperture and the air entry opening.

2. The apparatus of claim 1 in which the means for introducing the baffle comprises hinge means pivotally supporting the baffle adjacent to the shroud at a location between the air entry opening and shroud and a spring resiliently rotating the baffle around the hinge to a position with the baffle extending across the head entry aperture whereby air flow across the baffle caused by initial rotation of the disc pack causes the baffle to rotate about the hinge.

3. The apparatus of claim 2 characterized further by the inclusion of a safety switch mounted adjacent to the shroud for sensing the position of the baffle.

4. In a magnetic recording disc drive having a disc pack receiving zone, means for supporting and rotating a pack of parallel discs in the zone in a predetermined direction around an axis, and a shroud peripherally encircling the zone, the improved means for circulating air through the zone which comprises a baffle pivotally mounted adjacent to the shroud at a hinge line generally parallel to the axis of rotation of the disc pack, spring means resiliently urging the baffle around the hinge line in the direction opposite to the predetermined direction of rotation of the disc pack to retract the baffle against the shroud, an air exit opening in the shroud, and an air entrance opening in the shroud on the opposite side of the hinge line from the air exit opening whereby initial rotation of the disc pack causes air flow across the baffle until such air flow pulls the baffle toward the disc pack and the baffle thereafter causes air flow into the entrance opening and out of the exit opening while the disc pack continues to rotate.

5. The apparatus of claim 4 characterized further by the inclusion of stop means for limiting the rotation of the baffle by the air flow to hold the baffle in position between the rotating discs of the disc pack.

6. The apparatus of claim 5 characterized further by the inclusion of a safety switch mounted adjacent to the shroud for sensing the position of the baffle.

* * * * *